United States Patent [19]

Butler et al.

[11] 4,126,667
[45] Nov. 21, 1978

[54] PROCESS FOR THE EXCHANGE OF HYDROGEN ISOTOPES USING A CATALYST PACKED BED ASSEMBLY

[75] Inventors: John P. Butler; James den Hartog, both of Deep River; Fred W. R. Molson, Petawawa, all of Canada

[73] Assignee: Atomic Energy of Canada Limited, Ottawa, Canada

[21] Appl. No.: 733,417

[22] Filed: Oct. 18, 1976

[30] Foreign Application Priority Data

Jun. 25, 1976 [CA] Canada ................................ 255750

[51] Int. Cl.$^2$ .............................................. C01B 5/00
[52] U.S. Cl. ............................... 423/580; 423/648 A
[58] Field of Search ..................... 423/580 H, 648 A; 252/472

[56] References Cited

U.S. PATENT DOCUMENTS

| | | | |
|---|---|---|---|
| 2,690,379 | 9/1954 | Urey ................................ | 423/580 H |
| 3,681,021 | 8/1972 | Mikovsky et al. ................ | 423/580 H |
| 3,888,974 | 6/1975 | Stevens ............................ | 423/580 H |
| 4,025,560 | 5/1977 | Rolston et al. ................... | 423/648 A X |

*Primary Examiner*—O. R. Vertiz
*Assistant Examiner*—Wayne A. Langel
*Attorney, Agent, or Firm*—Francis W. Lemon

[57] ABSTRACT

A process for the exchange of hydrogen isotopes between streams of gaseous hydrogen and liquid water is described, wherein the streams of liquid water and gaseous hydrogen are simultaneously brought into contact with one another and a catalyst packed bed assembly while at a temperature in the range 273° to 573° K. The catalyst packed bed assembly may be composed of discrete carrier bodies of e.g. ceramics, metals, fibrous materials or synthetic plastics with catalytically active metal crystallites selected from Group VIII of the Periodic Table, partially enclosed in and bonded to the carrier bodies by a water repellent, water vapor and hydrogen gas permeable, porous, polymeric material, and discrete packing bodies having an exterior surface which is substantially hydrophilic and relatively non-catalytically active with regard to hydrogen isotope exchange between hydrogen gas and water vapor to that of the catalyst bodies. The catalytically active metal crystallites catalyze the hydrogen isotope exchange reaction between hydrogen gas and water vapor in the presence of liquid water while the polymeric material retards the loss of activity of the catalytically active metal crystallites caused by contact thereof by the liquid water. This catalyzed chemical isotope exchange proceeds simultaneously with isotope exchange from water vapor to liquid water by a non-catalyzed, physical evaporation and condensation exchange reaction and the addition of the discrete hydrophilic packing serves to increase this rate of isotope exchange between the water vapor and the liquid water. In other embodiments the catalyst structure and hydrophilic packing structure comprise a mixture of corrugated and flat metal sheet or gauze or a mixture of corrugated metal sheets or gauze packed or rolled such that fluid flow passage interstices are provided between the sheets and with the catalytically active metal crystallites deposited on some of the metal sheets or gauze.

10 Claims, 9 Drawing Figures

PROCESS FOR THE EXCHANGE OF HYDROGEN ISOTOPES USING A CATALYST PACKED BED ASSEMBLY

This invention relates to a process for the exchange of hydrogen isotopes using a packed catalyst bed assembly.

U.S. Pat. No. 2,690,379, dated 1954, H. C. Urey and A. V. Gross, discloses a process for the production of deuterium oxide, by bringing hydrogen containing deuterium and water together in a reaction chamber, and catalyzing the equilibrium reaction between them by means of a catalyst selected from or compounded from nickel, cobalt, iron, ruthenium, rhodium, palladium, osmium, iridium, platinum, molybdenum, tungsten and rhenium on an inert support. This isotopic enrichment process is an example of the application of a chemical exchange reaction between two hydrogen-containing species for the separation of the isotopes of hydrogen which differ in their atomic mass. Using deuterium as an example this chemical exchange reaction can be written in terms of the light isotope, protium (H), and the heavier isotope, deuterium (D) as $$HD \text{ gas} + H_2O \text{ liquid} \rightleftharpoons HDO \text{ liquid} + H_2 \text{ gas} \qquad (1)$$

where the equilibrium constant, $K_1$, is given in terms of the molar concentrations as $$K_1 = [HDO][H_2]/[HD][H_2O] \qquad (2)$$

The degree of isotopic separation for the chemical exchange process between streams of hydrogen and liquid water can be characterized by the separation coefficient, $\alpha$, which is defined as the ratio of the atom fractions of the heavy to light isotopes in the water phase relative to those in the hydrogen gas.

$$\alpha = \frac{\left(\frac{D}{H}\right)_{H_2O \text{ liquid}}}{\left(\frac{D}{H}\right)_{H_2 \text{ gas}}} \qquad (3)$$

The magnitude of the process separation coefficient, $\alpha$, is proportional to the equilibrium constant, $K_1$, of the chemical exchange reaction and varies with temperature, but as defined, is always greater than unity. Hence, under conditions of isotopic equilibrium between streams of liquid water and hydrogen gas, the deuterium concentration in the liquid water, D/H $H_2O$ liquid, is always greater than the deuterium concentration in the hydrogen gas, D/H $H_2$ gas. In a separation process in which streams of hydrogen and liquid water, carrying deuterium concentrations other than the equilibrium concentration, are brought into contact with one another, under conditions where distribution of the hydrogen isotopes can occur, there will be a net transfer of atoms of the heavy isotope from one phase to the other which is exactly offset by a net transfer of atoms of the light isotope in the opposite direction. The net transfer will tend to proceed until the ratio of the isotopic contents of the two streams reaches the equilibrium value given by equation (3). As isotopic equilibrium between the two streams is being established the initial concentration of the heavier hydrogen isotope (deuterium) in one stream will be raised above its initial level to approach the new equilibrium value which is characteristic of the temperature and operating conditions of the process.

It is a desirable feature of any practical process involving transfer of hydrogen isotopes between streams of hydrogen and liquid water that the transfer proceed at the highest possible rate so that the equilibrium distribution of the isotopes be attained in the shortest possible time and also in the smallest possible volume. This is particularly important in a multistage or cascade process, such as described by M. Benedict and T. H. Pigford in Nuclear Chemical Engineering, McGraw-Hill, 1957, in which the streams of hydrogen gas and liquid water are required to flow substantially in opposite directions between stages, although not necessarily within each stage. In such a process, a stage can be defined as the unit volume through which streams of hydrogen and liquid water pass and in which the approach to the equilibrium isotope distribution can be measured or calculated in some reasonable manner.

The most economical and efficient way to accomplish a hydrogen isotope exchange between the two streams is to keep the bulk of the water continuously in the liquid state and to flow this saturated with dissolved hydrogen downwardly, through a packed catalyst bed, in the opposite direction to the flow of gaseous hydrogen, saturated with water vapour.

One major problem with the process disclosed in the above United States patent is that, while catalysts have been found to catalyze the hydrogen isotope exchange between hydrogen and water vapour, these same catalysts show a large and undesirable loss of activity when brought into intimate contact with liquid water. The intimate contacting of the liquid water with the catalytically active metal results in isolating the catalytically active metal from the hydrogen gas. This drastically limits the rate of the exchange since only hydrogen dissolved in the liquid is then readily available for isotopic exchange. In the presence of liquid water the resulting activity is too low for the process to be economical and so in the plant described in "Production of Heavy Water", by M. Murphy, H. C. Urey and I. Kirshenbaum, McGraw-Hill Book Co., N.Y., 1955, p. 14, contact of liquid water with the catalyst was prevented by physically separating the catalyst from the stream of liquid water and by maintaining the relative humidity of the process stream below the saturation level while in contact with the catalyst. Such a process, while operable in a satisfactory manner, is expensive, and so it would be desirable to prevent the deactivation of the catalytically active metal by contact with liquid water and provide a hydrogen isotope exchange process between streams of gaseous hydrogen and liquid water wherein the catalyst assembly need not be physically separated from the stream of liquid water.

U.S. Pat. No. 3,888,974, dated June 10, 1975, by W. H. Stevens is directed to the problem of providing a bithermal process for hydrogen isotope exchange between gaseous hydrogen and liquid water using a catalytically active metal and wherein deactivation of the catalytically active metal by liquid water is retarded. This Stevens' process uses a catalyst provided with a substantially liquid-water-repellent organic resin or polymer coating, which is permeable to water vapour and hydrogen gas, and the overall catalytic exchange of isotopes between streams of hydrogen and liquid water primarily occurs by a two-step exchange process with the following simultaneous reactions being closely coupled in space, Step 1

Step 2

HDO (liquid) + H₂O (vapour)

While the process of the Stevens' patent is undoubtedly a great improvement in retarding the deactivation of the catalytically active metal by contact with the liquid water stream, there remains a need to further retard the deactivation of the catalytically active metal by contact with liquid water and at the same time to increase the rate of hydrogen isotope exchange and thus provide a more economical process.

U.S. Pat. No. 4,025,560, dated May 24, 1977, J. H. Rolston, W. H. Stevens, J. P. Butler and J. den Hartog discloses a similar process to that described in the Stevens' patent but wherein deactivation of the catalytically active metal is retarded while at the same time a greater rate of hydrogen isotope exchange is achieved. In this Rolston et al process at least one catalyst assembly is used having a metallic catalyst consisting of at least one Group VIII metal, deposited in the pores of a porous, inherently hydrophobic support. The porous, inherently hydrophobic support acts as a casing for the catalytically active metal and substantially prevents the catalyst from being contacted by the liquid water stream while allowing hydrogen gas and water vapour to rapidly contact the catalyst, whereby even though streams of liquid water and hydrogen gas are brought into contact with each other in the presence of the catalyst assembly, the exchange occurs primarily by the two steps mentioned above in the Stevens' patent but with a slower rate of deactivation of the catalytically active metal.

Until now the research for the Stevens' and Rolston et al processes has been directed to improving the casing around the catalytically active metal so that there is better contact between the hydrogen gas, water vapour and catalyst, thus increasing the rate of hydrogen isotope exchange between the hydrogen gas and water vapour. A problem still remains, however, in that the overall rate of hydrogen isotope exchange in a packed catalyst bed assembly is limited to the hydrogen gas/water vapour exchange or the water vapour/liquid water exchange depending upon which exchange is proceeding at the slowest rate. Thus even though the Rolston et al process may increase the rate of hydrogen isotope exchange from the hydrogen gas to water vapour, the packed catalyst bed assembly of the Rolston et al process cannot make full use of this increased exchange rate because the water vapour/liquid water exchange rate is now limiting the overall exchange rate between hydrogen gas and liquid water.

It is an object of some embodiments of the present invention to provide a hydrogen isotope, two-step exchange process of the kind described in the above Stevens' Rolston et al patents, and wherein the rate of water vapour hydrogen isotope exchange between the water vapour and liquid water in a packed catalyst bed assembly is increased thereby increasing the overall rate of hydrogen isotope exchange between the hydrogen gas and liquid water.

Further, while the Rolston et al process is undoubtedly an improvement over the Stevens' process in that there is a reduction in the amount of catalyst bodies necessary, the catalyst cost is still undesirably high, and so it would be desirable to provide a process wherein the comparable isotope exchange rates can be achieved with an even greater reduction in the amount of catalyst bodies.

It is also an object of some embodiments of the present invention to provide a hydrogen isotope exchange process wherein a comparable isotope exchange rate is achieved to that in the Rolston et al process with less catalyst bodies present in a packed catalyst bed assembly.

A further problem with the Rolston et al process is that it is not possible to select the rate of hydrogen isotope exchange in the two steps and maximize the overall hydrogen isotope exchange rate for a given volume of catalyst bodies and in so doing minimize the cost of the catalyst bodies for any given set of operating conditions including such operating parameters as temperature, pressure and gas flow rate at which the hydrogen gas, liquid water and catalyst bodies are brought into contact with one another.

It is a further object of some embodiments of the present invention to provide a hydrogen isotope exchange process wherein it is possible to select the rate of hydrogen isotope exchange in the two steps and maximize the overall hydrogen isotope exchange rate for a given volume of catalyst bodies and in so doing minimize the cost of the catalyst bodies for any given set of operating conditions including such operating parameters as temperature, pressure and gas flow rate at which the hydrogen gas, liquid water and catalyst bodies are brought into contact with one another.

It is a further object of the present invention to achieve partial physical separation of the liquid water from the catalytically active surfaces wherein the non-catalytic hydrophilic packing surfaces provide more preferred paths and channels for the flow of liquid water down the packed bed. This minimizes the contacting of the flowing water with the catalyst surfaces and as a result tends to further retard the deactivation of the catalyst.

According to the present invention there is provided a process for the exchange of hydrogen isotopes using a catalyst packed bed assembly, comprising:

a. simultaneously contacting streams of liquid water and hydrogen gas with one another and a packed catalyst bed assembly in the path of the contacting streams, both of said streams being at a temperature in the range 273° to 573° K., with one of the streams containing a concentration of a hydrogen isotope in excess of that which it would contain when the liquid water-gaseous hydrogen streams are in isotopic equilibrium at the operating conditions of temperature and mass flow rates of the streams and the other stream being a deficient stream and containing a concentration of that hydrogen isotope which is less than that which it would contain when the liquid water-gaseous hydrogen are in equilibrium at said operating conditions, so that the deficient stream is enriched by transfer of the hydrogen isotope in a two-step hydrogen isotope exchange from the other stream, and b. recovering the said stream enriched in the hydrogen isotope, and wherein:

c. the catalyst packed bed assembly comprises:

i. a catalyst structure comprising at least one support, catalyst crystallites of at least one catalytically active metal selected from Group VIII of the Periodic Table on the support, and a water repellent, water vapour and hydrogen gas permeable, porous, polymeric material partially enclosing the catalyst crystallites to substantially inhibit the contact of liquid water with the catalyst crystallites while allowing contact therewith of hydrogen gas and water vapour from the liquid water, ii. a packing structure interspersed with (i) to form therewith the catalyst packed bed assembly across the whole path of the contacting streams, and having an exterior surface which is substantially hydrophilic and relatively non-catalytically active with regard to hydrogen isotope exchange between hydrogen gas and water vapour to that of the catalyst bodies, so that:

d. The hydrogen isotope exchange primarily occurs simultaneously between hydrogen gas and water vapour contacting the liquid water and that liquid water, and the substantially hydrophilic exterior surface of the packing structure increases the contact surface area between the water vapour and liquid water thereby increasing the rate of hydrogen isotope exchange between water vapor and liquid water.

In some embodiments of the present invention the catalyst packed bed assembly comprises a plurality of the catalyst structures in the form of discrete catalyst bodies and a plurality of the packing structures in the form of discrete packing bodies.

Thus some embodiments of the present invention provide a greatly improved performance of and control of the rate of isotope exchange in the Stevens' and Rolston et al. type processes by having the catalyst packed bed assembly in a form that may be described as diluted with discrete packing bodies having an exterior which is substantially hydrophilic and substantially non-catalytically active.

The size, shape and surface properties of these packing bodies having a relatively non-catalytically active exterior affect the overall rate of hydrogen isotope exchange. Preferably the exterior of the packing bodies which is hydrophilic is ideally rough to increase the wetted surface area to further improve the liquid distribution in the catalyst bed assembly and thereby increase the rate of hydrogen isotope exchange between water vapour and liquid water. Packing bodies wherein the exterior is hydrophobic, as will be shown later, are not nearly as effective in increasing the rate of hydrogen isotope exchange between water vapour and liquid water as are packing bodies wherein the exterior is hydrophilic.

The catalyst packed bed assembly may consist of a random distribution of catalyst bodies interspersed with packing bodies. The percentage of catalyst bodies, by total volume of catalyst bodies plus packing bodies may vary from 1 to 99%. Further, layers of catalyst bodies interspersed with alternating layers of packing bodies, with the layers extending across the direction of flow of both streams, can also be used effectively as the packed catalyst bed assembly. In this case each layer thickness of the non-catalytic hydrophilic packing bodies preferably does not exceed that depth required to bring the deuterium concentration of the water vapour into near equilibrium, about 95%, with the liquid water and each layer thickness of the catalyst bodies preferably does not exceed that depth required to bring the deuterium concentration of the water vapour into near equilibrium, about 95%, with the hydrogen gas. For the non-catalytic hydrophilic packing bodies the layer depth varies markedly with the size and type of packing bodies and the gas flow rate, i.e., for 0.64 cm ceramic saddles at a hydrogen flow of 1 m s$^{-1}$ at STP the depth should not exceed 20 cm, while at a higher gas flow of 20 m s$^{-1}$ at STP the depth should not exceed 60 cm. For the catalyst bodies the layer depth varies inversely with the activity of the catalyst for the hydrogen-water vapour exchange reaction (Step 1), for example this depth for a hydrogen flow rate of 1 m s$^{-1}$ at STP should not exceed 10 cm for the 0.37% platinum-carbon-Teflon catalyst used in Example 4 of this patent.

For any practical process involving the transfer of hydrogen isotopes between streams of hydrogen and liquid water for heavy water production, it is necessary to have the hydrogen isotope transfer proceed at the highest possible rate so that the equilibrium distribution of isotopes can be attained in the shortest possible time and in the smallest possible volume. Since the natural concentration of deuterium in water is very low (D/H $\approx$ 144 ppm depending upon locality) the system must be equilibrated in many stages to obtain an effective separation. The most economical and efficient way to accomplish this is with a countercurrent flow of the two streams, with the gaseous hydrogen being fed upward in contact with and through the catalyst bed packed assembly and the liquid water trickling downward over and through the catalyst packed bed assembly. Alternatively, both the stream of gaseous hydrogen and the stream of liquid water may be fed concurrently upward or downward into contact with and through the catalyst packed bed assembly in the individual stages in the column but with the overall flow of the two streams in the column to be countercurrent.

The process according to the present invention can be used for the separation of tritium (mass 3) from light hydrogen (mass 1), or tritium (mass 3) from deuterium (mass 2), or the separation of all three isotopes, as well as the separation of light hydrogen from deuterium which is given below by way of example.

In the accompanying drawings which illustrate, by way of example, embodiments of the present invention.

The greatly improved performance of a process using a catalyst bed assembly composed of a random mixture of the discrete catalyst bodies and the discrete packing bodies is illustrated in the following example:

EXAMPLE 1

Figure 1:
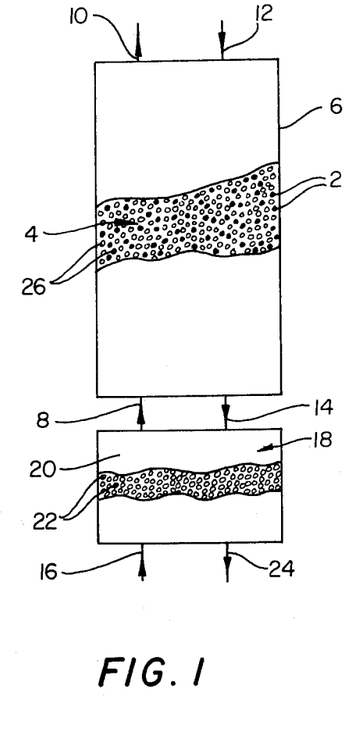
FIG. 1 is a diagrammatic side view, with parts cut away, of an apparatus for hydrogen isotope exchange and concentration between liquid water and hydrogen gas.

The Effect of Hydrophilic Packing Bodies in Catalyst Packed Bed Assemblies The catalyst bodies used comprised by weight 0.5% Pt catalyst crystallites deposited on 3.2 mm pellets of alumina; made water repellent, hydrogen gas and water vapour permeable by applying a coat of a siloxane polymer, Dow Corning 773, as described in the above mentioned U.S. Pat. No. 3,888,974 (W. H. Stevens). The catalyst bodies 2, in Figure were packed as a catalyst packed bed assembly 4, depth 0.1 m, in a glass column 6 with a cross-sectional area of 483 mm². Provisions were made through an inlet 8 and outlet 10 to contact the catalyst packed bed assembly 4 with an upward flow of purified hydrogen at near natural isotopic abundance (D/H = 110 ppm) and with deuterium enriched liquid water (D/H = 1140 ppm) which was trickled downwardly through the catalyst packed bed assembly 4. Experiments were also carried out using natural water 4 using inlet 12 and outlet 14. (D/H = 144 ppm) and enriched hydrogen (D/H = 250 ppm). The hydrogen gas was first passed upward through an inlet 16 to a humidifier 18 consisting of a column 20 randomly packed with non-catalytic packing bodies 22 in which the effluent water from the outlet 14 from the catalyst bed assembly 4 flows downward from the outlet 14 to an outlet 24. This arrangement served to saturate the hydrogen gas with water vapour in isotopic equilibrium with the liquid water flowing from the bottom of the catalyst bed assembly 4. The amount of deuterium transferred between the two streams as they passed through the catalyst packed bed assembly 4 was determined by measuring the increase in deuterium content of the hydrogen gas stream from outlet 10, freed of water vapour, after its passage through the column 6. Various experiments were carried out with the catalyst packed bed assembly 4 containing, varying amounts of catalyst bodies 2 randomly mixed with 3.2 mm pellets 26 of γ-alumina as the inert, hydrophilic packing bodies.

The deuterium isotope exchange efficiency, $\eta$, of the column 6 was expressed as the fractional approach to complete deuterium isotope equilibrium between the two phases in the column 6 where $$\eta = (n - n_o/n_e - n_o) \quad (4)$$

and $n_o$, $n_e$ and $n$ are the inlet, equilibrium and outlet atom ratios of deuterium (D/H) in the hydrogen gas stream. The degree of isotopic separation for the deuterium exchange process between hydrogen and liquid water is characterized by a separation factor, $\alpha$, defined as the atom fraction of the heavy to light isotopes in the liquid water relative to the atom fraction in the hydrogen gas at equilibrium.

$$\alpha = (D/H)H_2O, \text{ liquid}/(D/H)_{H_2}, \text{ gas} \quad (3)$$

The magnitude of the separation factor, $\alpha$, varies with temperature and for low deuterium concentrations is equal to the equilibrium constant, $K_1$, for the isotopic exchange reaction:

$$HD \text{ gas} + H_2O \text{ liquid} \rightleftharpoons HDO \text{ liquid} + H_{2_{gas}} \quad (1)$$

Since the deuterium content of the liquid water changes only slightly in these test experiments, the deuterium content of the hydrogen in equilibrium with the water, $n_e$, can be evaluated from equation (3) and the D/H ratio of the inlet water.

From the exchange efficiency, $\eta$, the overall rate of the isotopic exchange reaction, $K_y a$, between hydrogen gas and liquid water for unit volume of catalyst bed assembly, expressed as meters³ HD at STP per second per cubic meter of catalyst packed bed assembly is given by the expression:

$$K_y a = \frac{F_{H_2} \cdot A}{V} [-\ln(1 - \eta)] \quad (4)$$

where $F_{H_2}$ is the superficial flow rate of hydrogen in meters per second measured at STP, $A$ is the cross-sectional area of the column 6 in square meters, and $V$ is the volume of the catalyst packed bed assembly 4 in cubic meters consisting either of 100% by volume discrete catalyst bodies 2 or various mixtures of discrete catalyst bodies 2 randomly mixed with discrete bodies of the packing 26. Where % by volume is used, the volume referred to is the total volume of all discrete bodies forming the catalyst packed bed assembly 4.

Figure 2:
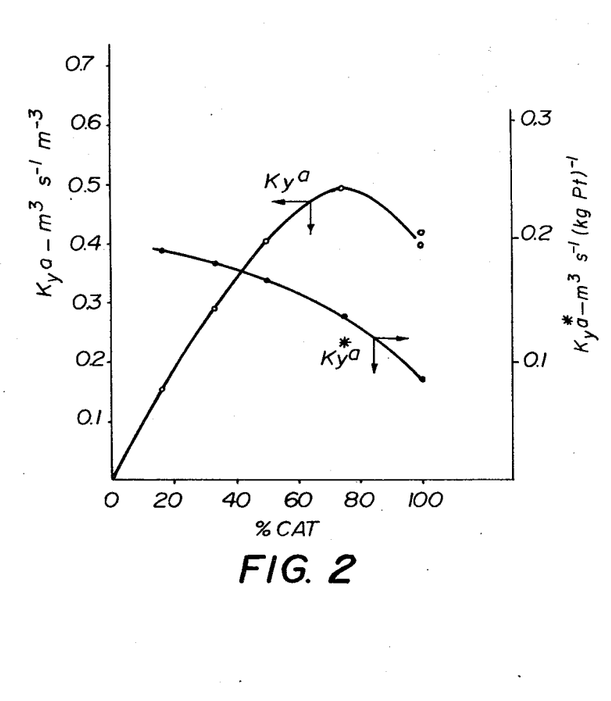
FIG. 2 is a graph showing the rate of deuterium isotope exchange, $K_ya$, and specific activity, $K_ya^*$, plotted against the % catalyst bodies by volume of the total volume of all discrete bodies in a catalyst packed bed assembly, % CAT, comprising discrete bodies of the catalyst and discrete, randomly dispersed, relativey non-catalytically active, hydrophilic, packing bodies in the form of pellets.

The overall rate of the deuterium exchange reaction or the volume transfer coefficient, $K_y a$, measured at 298K and a pressure of 0.10 MPa for catalyst packed bed assemblies 4 containing various mixtures of discrete catalyst bodies and non-catalytic hydrophilic pellets of γ-alumina as the packing bodies are given in Table 1 and shown as 0 in FIG. 2.

Table 1

The Activity of Catalyst Packed Bed Assemblies Composed of Discrete Catalyst Bodies of Silicone Treated 0.5% Pt—Al₂O₃ Randomly Intermingled with the Non-catalytic, Hydrophilic Pellets as the Packing Bodies.

| % Catalyst by volume | $K_y a$ m³ s⁻¹ m⁻³ | $K_y a^*$ |
|---|---|---|
| 100 | 0.418 | 0.087 |
|  | 0.397 | 0.083 |
| 75 | 0.495 | 0.138 |
| 50 | 0.405 | 0.169 |
| 33.3 | 0.292 | 0.183 |
| 16.5 | 0.153 | 0.194 |

The liquid flow rate was 0.69 kg M⁻² s⁻¹ and the hydrogen gas flow rate was 0.10 m s⁻¹ at STP. The specific activity, $K_y a^*$ also given in Table 1 is defined as the overall rate of the deuterium exchange reaction for a unit concentration of platinum in the catalyst packed bed assembly where $K_y a^* = K_y a/\text{kg Pt}$ per m³ catalyst packed bed assembly, and is a measure of how efficiently the platinum catalyst metal is being utilized. The data for $K_ya^*$ is displayed in FIG. 2 as • and it is noted that the specific activity increases smoothly with dilution of the discrete catalyst bodies by the non-catalytic, hydrophilic pellets forming the packing bodies and appears to be approaching a limiting value at high dilutions. It should also be noted that in this series of experiments a catalyst packed bed assembly containing about 50% by volume catalyst bodies has essentially the same catalytic activity as that observed with 100% by volume catalyst bodies; that is the specific activity has increased by a factor of 2. Further, that useful dilutions comprise catalyst bed assemblies containing catalyst bodies in the range 1% to 80% by volume of the total volume of catalyst and packing bodies in the catalyst packed bed assembly.

As stated above, the overall exchange of hydrogen isotopes between streams of hydrogen, water vapour and liquid water primarily occurs in two simultaneous reaction steps closely coupled in space:

Reaction 1

$$HD + H_2O_{vapour} \underset{\text{catalysts}}{\rightleftharpoons} H_2 + HDO_{vapour}$$

Reaction 2

$$HDO_{vapour} + H_2O_{liquid} \underset{\text{liq. water surface}}{\rightleftharpoons} HDO_{liquid} + H_2O_{vapour}$$

and this example clearly shows that the addition of hydropholic packing bodies increases the liquid water surface area in the catalyst packed bed assembly and allows reaction (2) to proceed at a faster rate, resulting in the improved performance obtained with catalyst packed bed assemblies comprising catalyst bodies intermingled with non-catalytic hydrophilic packing bodies.

EXAMPLE 2

Figure 3:
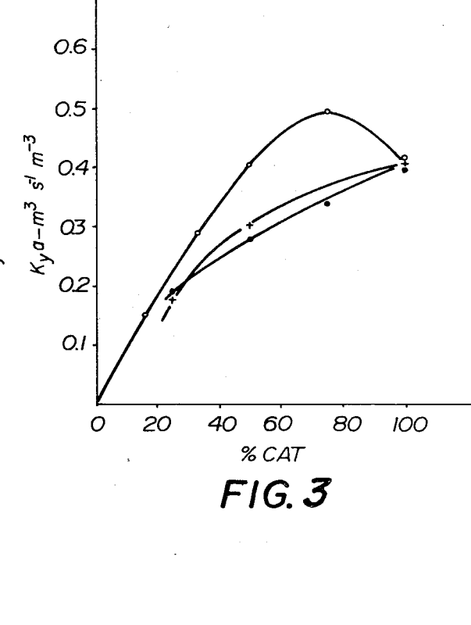
FIG. 3 is a graph showing the rate of deuterium isotope exchange, $K_ya$, plotted against the % catalyst bodies volume of the total volume of all of the discrete bodies, % CAT, in a similar catalyst packed bed assembly to that of FIG. 2, but using relatively non-catalytically active, hydrophilic pellets, relatively non-catalytically active hydrophobic pellets, or relatively non-catalytically active hydrophilic ceramic saddles as the discrete packing bodies in three different series of experiments.

The Effect in Catalyst Packed Bed Assemblies of Shape, Size and Hydrophobicity of the Discrete Non-Catalytic Packing Bodies Samples of the silicone treated 0.5% Pt on γ-alumina discrete catalyst bodies, as used in Example 1, were diluted with hydrophilic 6.4 mm ceramic Berl saddles randomly dispersed therewith as a catalyst packed bed assembly. The same catalyst bodies were also diluted as a catalyst packed bed assembly with silicone coated non-catalytic alumina pellets as hydrophobic discrete packing bodies of the same size and shape as the catalyst bodies. Activities observed for various dilutions are summarized in Table 2 and displayed for comparison along with the results from Example 1 in FIG. 3 where, 0 is for packing bodies comprising hydrophilic 3.2 mm Al₂O₃ pellets,

• is for packing bodies comprising hydrophobic 3.2 mm Al₂O₃ pellets (silicone coated) and + is for packing bodies comprising 6.4 mm ceramic Berl saddles.

Table 2

The Activity of Catalyst Packed Bed Assemblies of Silicone Treated 0.5% Pt—Al₂O₃ Catalyst Bodies Diluted with Hydrophobic and Hydrophilic Non-Catalytic Packing Bodies

| Packing Bodies | % Catalyst by Volume | $K_ya$ $m^3 s^{-1} m^{-3}$ | $K_ya^*$ |
|---|---|---|---|
| 3.4 mm pellets Hydrophobic | 100 | 0.397 | 0.083 |
| | 75 | 0.337 | 0.094 |
| | 50 | 0.282 | 0.118 |
| | 25 | 0.192 | 0.160 |
| 6.4 mm Berl saddles Hydrophilic | 100 | 0.397 | 0.083 |
| | 50 | 0.305 | 0.127 |

Table 2-continued

The Activity of Catalyst Packed Bed Assemblies of Silicone Treated 0.5% Pt—Al₂O₃ Catalyst Bodies Diluted with Hydrophobic and Hydrophilic Non-Catalytic Packing Bodies

| Packing Bodies | % Catalyst by Volume | $K_ya$ $m^3 s^{-1} m^{-3}$ | $K_ya^*$ |
|---|---|---|---|
| | 25 | 0.178 | 0.149 |

These experiments show that all discrete packing body diluents markedly improve the catalytic activity of the catalyst packing bed assembly over that expected from a straight dilution effect. However, dilutions with hydrophobic, silicone coated, alumina pellets as the packing bodies produced a much smaller improvement than hydrophilic, uncoated, alumina pellets as the packing bodies given in Example 1. Thus with 50% by volume catalyst bodies, the hydrophobic pellets as packing bodies improve the specific deuterium exchange activity by a factor of only about 1.4 compared to a factor of 2.0 for the hydrophilic pellets as the packing bodies. It was also noted that the shape and size of hydrophilic packing bodies had an effect on the catalytic activity of the catalyst packed bed assembly, for example, 6.4 mm ceramic Berl saddles, gave a smaller improvement factor of 1.5. It should be noted that when hydrophilic packing bodies are referred to, what is important is the hydrophilic exterior of the packing bodies, that is the surface which is contacted by liquid water. Thus it would not matter if hydrophilic packing bodies had an interior composed of a hydrophobic material.

EXAMPLE 3

The Effect of Inert Packing Bodies in a Catalyst Packed Bed Assembly Containing a Platinized Carbon Type of Catalyst Bodies Catalyst bodies were prepared by depositing a platinized carbon powder containing 10% platinum by weight on rough ceramic spheres, 4.6 mm in diameter, using a water emulsion of polytetrafluoroethylene (e.g. that marketed by E. I. Du Pont under the trade name Du Pont 30) as an adhesive and water repellent, hydrogen gas and water vapour permeable covering for the platinum. The resulting catalyst bodies contained about 0.32% by weight platinum.

Figure 5:
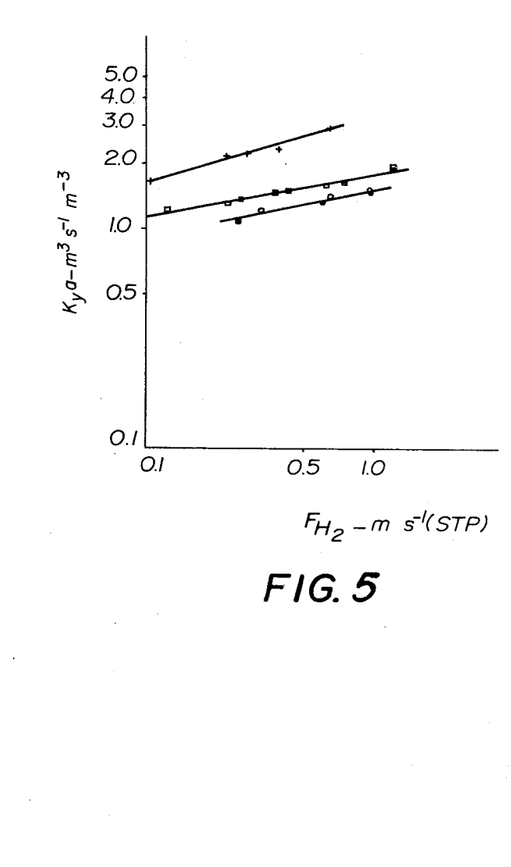
FIG. 5 is a graph showing the rate of deuterium isotope exchange, $K_y a$, for various platinized carbon polytetrafluoroethylene catalysts on different carriers plotted against the superficial hydrogen gas flow rate, $F_{H_2}$, wherein the packed catalyst bed assemblies consisted of a random mixture of catalyst bodies and non-catalytic hydrophilic packing bodies.

The activity of the catalytic bodies was measured at 298K and 0.11 MPa in a catalyst packed bed assembly with a cross sectional area of 480 mm² and length 0.20 m. Measurements were also made on catalyst bed assemblies consisting of a random mixture of 50% catalyst bodies by volume and 50% packing bodies in the form of inert, hydrophilic, rough ceramic spheres of the same diameter as the catalyst bodies. The results obtained at various hydrogen flow rates for 100% and 50% catalyst bodies by volume in catalyst packed bed assemblies are summarized in Table 3. The effect of hydrogen flow on the activity of the catalyst in a packed bed assembly containing 50% catalyst bodies is also shown in FIG. 5 for two liquid water flow rates, 2.4 kg s⁻¹ m⁻² designated by 0 (Run T23B) and 2.0 kg s⁻¹ m⁻² designated by 0 (Run T23E). The activity of the catalyst, $K_ya$, increases with hydrogen gas flow rate, for catalyst packed bed assemblies containing 100% catalyst bodies, $K_ya$ increases as the 0.35 power of the gas flow rate while for catalyst packed bed assemblies containing 50% catalyst bodies, $K_ya$ increases as 0.22 power. At all gas flow rates the catalyst packed bed assemblies having 50% catalyst bodies by volume gave a slightly higher activity. For the catalyst packed bed assemblies containing 100% catalyst bodies the amount of platinum per unit volume of packed bed was 3.49 and 3.24 kg Pt m$^{-3}$ for runs T23A and T23D respectively while for the catalyst packed bed assemblies containing 50% catalyst bodies the value was 1.73 kg Pt m$^{-3}$. From the data in Table 3, the specific activity, $K_ya^*$ for the diluted catalyst packed bed assemblies containing 50% catalyst bodies is a factor of 2.2 greater than obtained for beds containing 100% catalyst bodies. The addition of the non-catalytic hydrophilic ceramic spheres enhances the water vapor-liquid water isotopic exchange reaction and as a result greatly improves the overall performance of the catalyst packed bed assembly.

gas flow rates. A comparison of the data shows that the randomly mixed catalyst packed bed assemblies containing 55.5% catalyst by volume have essentially the same overall activity, $K_ya$, as the catalyst bed packed assemblies composed solely of catalyst bodies and thus the mixed bed assemblies have a greater specific activity by a factor of 1.8. The layered packed bed catalyst assembly has about the same activity as the catalyst packed bed assembly containing a random mixture of catalyst bodies and non-catalytic hydrophilic packing bodies, thus showing that layered beds are also effective in enhancing the overall activity of the catalyst.

Table 3

The Effect of Dilution and Hydrogen Flow Rate on the Activity of a 0.32% Platinum-Carbon-Teflon Catalyst (T 23) on Rough Ceramic Spheres Conditions: Column Area - 480 mm$^2$; Temperature - 298.2K; Pressure - 0.108 MPa

| Run No. | Bed Length m | % Catalyst Bodies by Volume | H$_2$ Flow Rate m s$^{-1}$ at STP | Water Flow kg s$^{-1}$ m$^{-2}$ | $m^3 s^{-1} K_ya m^{-2}$ | $m^3 s^{-1} K_ya^* (kg\ Pt)^{-1}$ |
|---|---|---|---|---|---|---|
| T23A | 0.183 | 100 | 0.336 | 2.4 | 1.03 | 0.30 |
|  |  |  | 0.644 | 2.4 | 1.29 | 0.37 |
|  |  |  | 0.979 | 2.4 | 1.50 | 0.43 |
| T23C | 0.152 | 100 | 0.245 | 1.9 | 0.91 | 0.28 |
|  |  |  | 0.468 | 1.9 | 1.10 | 0.34 |
|  |  |  | 0.626 | 1.9 | 1.30 | 0.40 |
|  |  |  | 0.820 | 1.9 | 1.38 | 0.42$_5$ |
|  |  |  | 0.958 | 1.9 | 1.47 | 0.45 |
|  |  |  | 1.094 | 1.9 | 1.54 | 0.47 |
| T23B | 0.208 | 50 | 0.324 | 2.4 | 1.23 | 0.71 |
|  |  |  | 0.644 | 2.4 | 1.42 | 0.82 |
|  |  |  | 0.956 | 2.4 | 1.56 | 0.90 |
| T23E | 0.210 | 50 | 0.252 | 2.0 | 1.10 | 0.64 |
|  |  |  | 0.591 | 2.0 | 1.34 | 0.77 |
|  |  |  | 0.964 | 2.0 | 1.49 | 0.86 |

EXAMPLE 4

A Layered Catalyst Packed Bed Assembly

In this example, a catalyst similar to that given in Example 3 was used but with the platinized carbon powder deposited and bonded with Teflon (Du Pont 30) to somewhat larger diameter, 6.1 mm, rough ceramic spheres. The catalyst bodies contained 0.37% by weight platinum.

The activity of the catalyst was measured at 298K and 0.11 MPa in a catalyst packed bed assembly of cross-sectional area 480 mm$^2$. Measurements were also made on a layered catalyst packed bed assembly consisting of layers of catalyst bodies alternating with layers of non-catalytic hydrophilic ceramic spheres of the same size and shape, with the layers extending across the direction of the flow reactants. The individual layers were about 35 mm in height and for the non-catalytic packing bodies this height was sufficient to bring the deuterium concentration of the water vapour into near equilibrium, about 83%, with the liquid water at a hydrogen gas flow rate of 0.6 m s$^{-1}$ at STP. In this packed bed assembly the individual layers of catalyst bodies, 35 mm in height, were sufficient to bring the deuterium concentration of the water vapour into near equilibrium, about 85%, with the hydrogen gas at a hydrogen flow rate of 0.6 m s$^{-1}$ at STP. Measurements were also made on a catalyst packed bed assembly consisting of a random mixture of the catalyst bodies and the non-catalytic packing bodies used in the layered bed assembly. For both the mixed bed assemblies the catalyst bodies were 55.5% of the packing volume and the non-catalytic packing bodies were 44.5%. The results obtained for the three different catalyst packed bed assemblies are summarized in Table 4 for various hydrogen Table 4

The Activity of a 0.37% Platinum-Carbon-Teflon Catalyst in Randomly Diluted and Layered Packed Bed Assemblies Conditions: Column Area - 480 mm$^2$; Temperature - 298.2K; Pressure - 0.107 MPa

| % Catalyst Bodies by Volume | Bed Length m | Water Flow kg m$^{-2}$ s$^{-1}$ | H$_2$ Flow Rate m s$^{-1}$ at STP | $m^3 s^{-1} K_ya m^{-3}$ |
|---|---|---|---|---|
| 100 | 0.300 | 2.1 | 0.265 | 0.74 |
|  | 0.203 | 2.1 | 0.343 | 0.79 |
|  |  | 2.1 | 0.515 | 0.91 |
|  |  | 1.9 | 0.607 | 1.04 |
|  |  | 2.1 | 0.629 | 0.98 |
| 55.5 Layered Bed | 0.250 | 1.7 | 0.286 | 0.75 |
|  |  | 1.7 | 0.316 | 0.77 |
|  |  | 1.7 | 0.650 | 1.00 |
| 55.5 Random Mixture | 0.255 | 1.7 | 0.320 | 0.82 |
|  |  | 1.7 | 0.628 | 1.03 |

EXAMPLE 5

Effect of Dilution of a Catalyst Packed Bed Assembly with Commercially Available Non-Catalytic Packing Bodies Special catalyst bodies were prepared commercially in a manner similar to that given in Example 3 with the platinized carbon bonded to commercial packing bodies in the form of 12.7 mm Intalox ceramic saddles supplied by Norton Chemical Process Products Division. The resulting catalyst bodies contained 0.38% Platinum. Measurements of the activity of an all-catalyst packed bed assembly and a diluted catalyst packed bed assembly containing by volume 50% catalyst and 50% inert hydrophilic 12.7 mm Intalox saddles, were made at 298K and 0.10 MPa in a column of cross-sectional area 2160 mm$^2$. Hydrogen flow rates were varied from 0.09 to 0.5 m s$^{-1}$ at STP. For columns packed with 12.7 mm Intalox saddles the catalyst packed bed assembly has a large void volume and in this low gas flow range the column is operating below fully turbulent conditions. As a result, the activity of the catalyst packed bed assemblies increased rapidly with gas flow rate and the activity measurements were not very reproducible and showed variations up to 15%. Catalytic activities calculated from a least squares fit of the data are given in Table 5 for integral values of hydrogen flow rate. Catalyst packed bed assemblies containing by volume 50% catalyst bodies and 50% plain 12.7 mm Intalox saddles as packing bodies have about the same activity as those containing 100% catalyst bodies by volume, again showing the improved performance obtained by dilution of the catalyst bodies with hydrophilic inert packing bodies.

Table 5

The Effect on the Activity of a Catalyst Packed Bed Assembly Comprising a 0.38% Platinum-Carbon-Teflon Catalyst on Intalox Saddles using Plain Intalox Saddles as the Non-Catalytic Packing Bodies Conditions: Column - 0.16 m × 2160 mm$^2$
Temperature - 298.2K
Pressure - 0.10 MPa
Water Flow - 1.55 kg m$^{-2}$ s$^{-1}$

| % Catalyst Bodies by Volume | H$_2$ Flow Rate m s$^{-1}$ at STP | K$_y$a* m s$^{-1}$ m$^{-3}$ |
|---|---|---|
| 100 | 0.10 | 0.255 |
|  | 0.20 | 0.36 |
|  | 0.30 | 0.45 |
|  | 0.40 | 0.52 |
|  | 0.50 | 0.58 |
| 50 | 0.10 | 0.25 |
|  | 0.20 | 0.345 |
|  | 0.30 | 0.41 |
|  | 0.40 | 0.47 |
|  | 0.50 | 0.52 |

EXAMPLE 6

The Effect of Dilutions of Catalyst Packed Bed Assemblies at High Pressure

Figure 4:
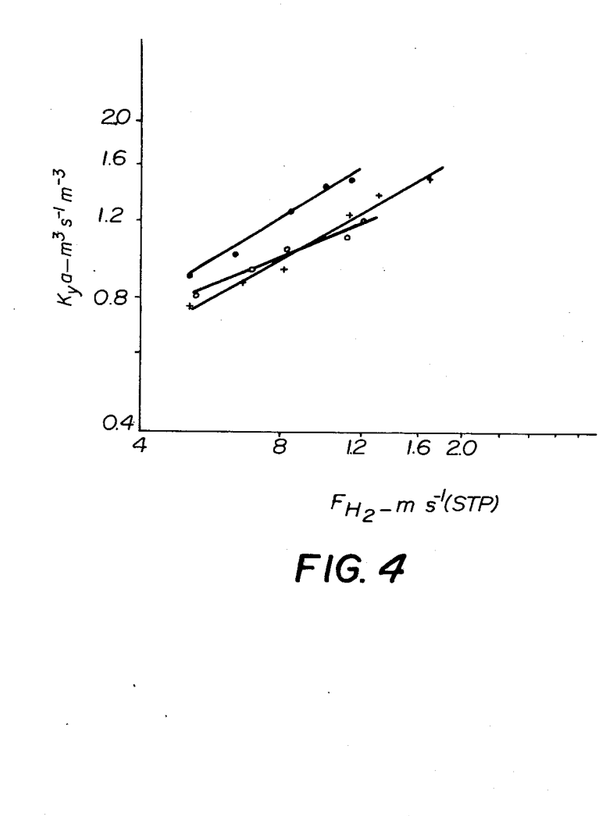
FIG. 4 is a graph showing the rate of deuterium isotope exchange, $K_ya$, plotted against the % catalyst bodies by volume of the total volume of all the discrete bodies, % CAT, in a similar catalyst packed bed assembly to that of FIG. 2 but using platinized carbon deposited on Intalox saddles as the catalyst bodies and inert Intalox ceramic saddles as the relatively non-catalytically active discrete packing bodies.

Measurements of the activity of a similar batch of the catalyst bodies and packing bodies described in Example 5 were made for mixed beds containing catalyst bodies and non-catalytic hydrophilic packing bodies of the same size and shape as the catalyst bodies at high pressures and high hydrogen flow rates. A large diameter column 0.1 m, was packed to a catalyst packed bed assembly depth of 1.52 m with catalyst bodies or a random mixture of catalyst bodies and non-catalytic packing bodies. The column was operated at 343K, a pressure of 5.27 MPa and a water flow rate of 2.43 kg m$^{-2}$ s$^{-1}$. The activity of the catalyst packed bed assemblies, K$_y$a, was measured for hydrogen flow rates varying from 5 to 17 m s$^{-1}$ at STP. The high pressure and the high hydrogen gas flow rates used in this example are approaching conditions that might be used for the commercial production of heavy water using the catalyzed hydrogen-water isotopic exchange reaction. The results for several dilutions are summarized in Table 6 and shown in FIG. 4 where 0 is for a catalyst packed bed assembly comprising 100% by volume catalyst bodies, • is for a catalyst packed bed assembly comprising 50% by volume catalyst bodies and + is for a catalyst packed bed assembly comprising 25% by volume catalyst bodies. For the hydrogen flow rates studied, catalyst packed bed assemblies composed solely of catalyst bodies and those of 25% by volume catalyst have about the same activity, while catalyst packed bed assemblies containing 50% by volume catalyst bodies are about 30% more active. Thus the catalyst packed bed assemblies containing 50% and 25% by volume catalyst bodies have specific activities which are 2.6 and 4.0 times greater, respectively, than the undiluted catalyst bed assemblies composed solely of catalyst bodies. This improved performance of catalyst packed bed assemblies containing 25% by volume catalyst bodies at high pressures and flow rates represents a considerable saving in the total cost not only of the expensive platinum metal used as the catalyst but also the amount of catalyst bodies used, which are costly to produce, both of these are major expenses in the commercial production of heavy water using the hydrogen-water exchange reaction.

Table 6

The Effect of Dilution of Catalyst Packed Bed Assemblies on the Activity of Catalyst Bodies Comprising a 0.35% Platinum-Carbon-Teflon Catalyst Deposited on Intalox Saddles Using Plain Intalox Saddles as Non-Catalytic Packing Bodies Conditions: Column - 1.52m × 0.0314 m$^2$
Temperature - 343K
Pressure - 5.27 MPa
Water flow - 2.43 kg m$^{-2}$ s$^{-1}$

| % Catalyst Bodies by volume | H$_2$ Flow Rate m s$^{-1}$ at STP | K$_y$a m$^3$ s$^{-1}$ m$^{-3}$ |
|---|---|---|
| 100 | 5.25 | 0.81 |
|  | 6.92 | 0.93 |
|  | 8.30 | 1.03 |
|  | 11.20 | 1.09 |
|  | 12.06 | 1.19 |
| 50 | 5.12 | 0.90 |
|  | 6.40 | 1.04 |
|  | 8.47 | 1.27 |
|  | 10.14 | 1.43 |
|  | 11.45 | 1.47 |
| 25 | 5.14 | 0.77 |
|  | 6.66 | 0.87 |
|  | 8.20 | 0.93 |
|  | 11.35 | 1.24 |
|  | 13.21 | 1.37 |
|  | 16.94 | 1.49 |

Preferably the packing bodies are substantially non-porous to reduce the amount of stagnant water hold-up in the catalyst packed bed assembly. For example, it has been observed that when the deuterium concentration of the liquid water feed to a 0.20 m packed bed catalyst assembly is changed by about a factor of 10, the deuterium concentration of the effluent hydrogen reaches a steady state in 3–4 minutes under operating conditions for a platinum-carbon-Teflon catalyst deposited on a non-porous carrier such as the catalysts used in this example and in Examples 3, 4, 5, and 7. However, for platinum catalysts prepared on very porous carriers such as alumina used in Examples 1 and 2, the time to reach steady state operating conditions after a change in the deuterium concentration of the water feed was 4.5 hours. This prolonged time required to reach steady operating conditions for platinum catalysts on porous carriers results from the large amount of stagnant water held up within the micro pores of the carrier which is only exchanged by a slow liquid diffusion process.

There are many types of packing bodies that may be used in the catalyst packed bed assembly, such as spheres, and those marketed as Raschig rings*, Lessing rings, Partition rings, Berl Saddles, Intalox saddles*, Super Intalox Saddles*, Flexirings Tellerettes*, Pall Rings, Dixon Rings* and Sulzer packings.
*trademark Sometimes it is less desirable to mix different types of packing bodies, for example, to mix catalyst bodies in the form of spheres with non-catalytic ceramic saddles as the packing bodies since the spheres tend to mesh or fit into the saddles producing a more tightly packed catalyst bed assembly with a lower void volume and a lower overall deuterium transfer rate. However, it may very desirable to use a layered bed consisting of layers of inert packing material that is extremely effective for the water vapour/liquid isotopic exchange reaction, such as Sulzer CY packing*, and layers of platinum catalyst on ceramic spheres.

*trademark

EXAMPLE 7

The Effect of the Hydrophilic Surface Area of the Non-Catalytic Bodies

Catalytic bodies were prepared by depositing a platinized carbon powder containing 10% platinum by weight on stainless steel Dixon rings (trademark) as the supports (diameter × height, 3 × 3 mm, gauze 100 mesh) obtained from Griffin and George Sales Limited, London, England. The platinized carbon powder, the same as was used in Example 3, was bonded to the Dixon rings with a water emulsion of polytetrafluoroethylene marketed by E. I. DuPont under the trade name DuPont 30. The polytetrafluoroethylene acted as an adhesive and water repellent covering which was hydrogen gas and water vapour permeable and the resulting catalyst bodies contained 0.41% by weight platinum.

The activity of the catalyst was measured at 298K and 0.11 MPa in a catalyst packed bed assembly of cross-sectional area 490 mm² and lengths of 0.12 and 0.22 m. Measurements were also made on catalyst packed bed assemblies consisting of a random mixture of 50% catalyst bodies by volume and 50% non-catalytic Dixon rings of the same size as the catalyst bodies. Prior to use, the Dixon rings were washed in acetone to degrease them and then heated in air at 1070K. This produced a thin oxide layer on the metal surface of the rings making them more hydrophilic so as to enhance the vapor-liquid exchange reaction, Reaction 2. The results obtained at various hydrogen flow rates for 100% and 50% catalyst bodies by volume in the catalyst packed bed assemblies are given in Table 7.

The activity of the catalyst, $K_ya$, for catalyst packed bed assemblies containing 100% catalyst bodies increases with the 0.11 power of the hydrogen gas flow rate, while in catalyst packed bed assemblies containing 50% catalyst bodies the rate increases as 0.20 power of the hydrogen gas flow rate. The results obtained for bed assemblies containing 50% catalyst bodies are also shown in FIG. 5 for two liquid water flow rates, 2.04 kg s⁻¹ m⁻² designated by □ (Run F2C) and 2.73 kg s⁻¹ m⁻² designated by ■ (Run F2D). It is seen that al-though the activity, $K_ya$, increases markedly with hydrogen gas flow rate, the activity is essentially independent of liquid flow rate in the range reported. For the catalyst packed bed assembly containing 100% catalyst bodies the amount of platinum per unit volume of bed was 1.90 kg Pt m⁻³ while for the catalyst packed bed assemblies containing 50% catalyst bodies the value was 0.98 kg Pt m⁻³. From the data in Table 7 it will be seen that the specific activity, $K_ya$*, of the diluted catalyst packed bed assemblies is a factor of 2.2 to 2.4 greater than that obtained for catalyst packed bed assemblies containing 100% catalyst bodies over the hydrogen gas flow range 0.3 to 1.2 m s⁻¹ at STP. Thus the addition of non-catalytic hydrophilic packing enhances the water vapour/liquid water isotopic exchange reaction for a given quantity of catalyst and so greatly improves the overall performance of the catalyst.

Table 7

The Effect of Dilution and Hydrogen Flow Rate on the Activity ($K_ya$) of a 0.41% Platinum-Carbon-Teflon Catalyst (F2) on Dixon Rings Conditions: Column Area - 490mm²; Temperature - 298.2K; Pressure - 0.108 MPa

| Run No. | Bed Length m | % Catalyst Bodies by Volume | H₂ Flow Rate m s⁻¹ at STP | Water Flow kg s⁻¹ m⁻² | $m^3 s^{-1} \frac{K_ya}{m^{-3}}$ | $m^3 s^{-1} \frac{K_ya^*}{(kg\,Pt)^{-1}}$ |
|---|---|---|---|---|---|---|
| F2A | 0.22 | 100 | 0.603 | 2.2 | 1.39 | 0.74 |
| F2B | 0.115 | 100 | 0.326 | 2.0 | 1.25 | 0.66 |
|  |  |  | 0.638 | 2.0 | 1.36 | 0.72 |
|  |  |  | 0.775 | 2.0 | 1.36 | 0.72 |
|  |  |  | 1.052 | 2.0 | 1.43 | 0.76 |
| F2C | 0.20 | 50 | 0.123 | 2.04 | 1.22 | 1.25 |
|  |  |  | 0.218 | 2.04 | 1.33 | 1.36 |
|  |  |  | 0.372 | 2.04 | 1.46 | 1.49 |
|  |  |  | 0.617 | 2.04 | 1.60 | 1.64 |
|  |  |  | 1.185 | 2.04 | 1.92 | 1.96 |
| F2D | 0.20 | 50 | 0.254 | 2.73 | 1.36 | 1.39 |
|  |  |  | 0.421 | 2.73 | 1.49 | 1.52 |
|  |  |  | 0.726 | 2.73 | 1.67 | 1.70 |
|  |  |  | 1.185 | 2.73 | 1.88 | 1.92 |

The specific activity, $K_ya$*, of catalyst, F2 (Table 7), in a catalyst packed bed assembly containing 50% catalyst is a factor of 2.0 greater than that obtained for catalyst, T23, under the same operating conditions (see Example 3, Table 3). Both catalysts were prepared from the same platinized carbon powder containing 10% by weight platinum, for the latter catalyst (T23) the platinized carbon powder was deposited on rough ceramic spheres while for the former it was deposited on Dixon rings. The higher specific activity of catalyst F2, in the diluted catalyst packed bed assembly mainly results from an enhancement of the water vapour-liquid water isotopic exchange rate achieved by increasing the hydrophilic surface in the catalyst packed bed assembly. Assuming that the water runs over the hydrophilic Dixon rings as a film the geometric surface area per cm³ of bed for a catalyst packed bed assembly containing 50% non-catalytic Dixon rings is about 8 cm² cm⁻³ of bed. For the rough ceramic spheres the corresponding geometric hydrophilic surface area is estimated at about 4.9 cm² cm⁻³ of bed assuming a roughness factor of 1.5. The higher hydrophilic surface of the Dixon rings is the main cause for the improved performance for catalyst packed bed assemblies containing platinized carbon catalysts deposited on this support and diluted with non-catalytic hydrophilic Dixon rings.

EXAMPLE 8

Improved Catalytic Packed Bed Assemblies

From a comparison of the data given in Examples 3 and 7 it is apparent that higher activities can be obtained by increasing the non-catalytic hydrophilic surface area per unit volume of the catalyst packed bed assembly and thus enhancing the water vapour-liquid water isotopic exchange rate of the previously described Reaction 2. Furthermore, it was felt that increasing the amount of platinum per unit volume of bed or increasing the geometric surface area on which the platinized carbon powder is deposited should increase the rate of the hydrogen-water vapour isotopic exchange reaction, Reaction 1 and thus enhance the overall transfer rate, that is, the activity of the catalyst. To this end, a catalyst packed bed assembly was prepared containing a random mixture of oxidized Dixon rings as the packing structure, which give a high vapour-liquid transfer rate (see Example 7), and a catalyst structure comprising platinized carbon particles deposited on a porous paper carrier and bonded thereto by polytetrafluoroethylene and cut into pieces of about 2 × 4 mm as the catalyst structure. With this arrangement it is possible to increase substantially the geometric surface area of the carrier per unit volume of bed on which the platinized carbon particle catalyst is deposited. Since the catalyst bodies forming the catalyst structure occupy only a very small volume in the catalyst packed bed assembly, more space is available for the non-catalytic hydrophilic Dixon rings compared to Example 7.

The catalyst was prepared by dipping the porous paper supports into a dispersion of platinized carbon powder and a water emulsion of polytetrafluoroethylene marketed by E. I. DuPont under the trade name DuPont 30. The platinized carbon powder contained 10% by weight platinum and was a sample of the same platinized carbon powder used in Examples 3 and 7. The catalyst was dried and the polytetrafluoroethylene was then cured. The resulting catalyst had the platinized carbon powder deposited on both sides of the porous paper support which were given wet strength as a result of the treatment with polytetrafluoroethylene. The catalyst structure thus produced contained 3.2% platinum by weight and the weight ratio of polytetrafluoroethylene/platinized carbon powder was 1.2.

The activity of the catalyst was measured at 298K and 0.11 MPa in a packed catalyst bed assembly of cross section 490 mm$^2$ and length 0.15 m. The packed catalyst bed assembly consisted of a random mixture of oxidized Dixon rings and 2 mm × 4 mm pieces of a 3.2% Platinum-Carbon-Teflon catalyst on a porous paper carrier. The results are listed in the following Table 8 as catalyst CAl and are designated + in FIG. 4.

Table 8

The Effect of Hydrogen Flow Rate on the Activity of a 3.2% Platinum-Carbon-Teflon Catalyst (CAI) on a Porous Paper Carrier and Diluted with Hydrophilic Dixon Rings

| Conditions: | Column | - 490 mm$^2$ × 0.15 m |
|---|---|---|
| | Temperature | - 298.2K |
| | Pressure | - 0.108 MPa |
| | Water Flow | - 1.8 kg s$^{-1}$ m$^{-2}$ |

| H$_2$ Flow Rate m s$^{-1}$ at STP | K$_y$a m$^3$ s$^{-1}$ m$^{-3}$ |
|---|---|
| 0.101 | 1.64 |
| 0.225 | 2.16 |
| 0.271 | 2.21 |
| 0.381 | 2.35 |
| 0.624 | 2.91 |

The activity for this catalyst bed packed assembly, K$_y$a, increases with the 0.30 power of the hydrogen gas flow rate. In FIG. 5 the activities as a function of gas flow rate are compared with those obtained for the 50% catalyst packed bed assemblies given in Examples 3 and 7. In the present example, the activity of the catalyst packed bed assembly, K$_y$a, for a given hydrogen gas flow rate is 2.1 times greater than that obtained for the 50% catalyst packed bed assembly given in Example 3, runs T23B (designated O in FIG. 4) and T23E (designated ● in FIG. 5), even though the amount of platinum per unit bed volume for both examples is about the same, 1.75 kg m$^{-3}$ and 1.73 kg m$^{-3}$ respectively. The higher activities in the present example result from the higher geometric area on which the platinized carbon powder is deposited, 11 cm$^2$/cm$^3$ of bed compared to 4.9 cm$^2$/cm$^3$ of bed for runs T23B and T23E, and from the higher hydrophilic geometric surface area of 13 cm$^2$/cm$^3$ of bed compared to 4.9 cm$^2$/cm$^3$ of bed for the runs T23B and T23E. It is also seen that the activity, K$_y$a, of the present catalyst packed bed assembly is higher by a factor of 1.6 than that obtained for 50% catalyst packed bed assemblies used in Example 7, runs F2C (□ in FIG. 5) and F2D (■ in FIG. 5). The higher activities result from the higher amount of platinum per unit volume of catalyst packed bed assembly and from the higher hydrophilic geometric surface per unit volume of bed which enhances the water vapour-liquid water isotopic exchange reaction. In the present example, since the catalyst bodies are very thin, they only occupy a very small fraction of the catalyst packed bed assembly, and so it is possible to increase the proportion of hydrophilic Dixon rings in the bed. Actually, the catalyst packed bed assembly contained 82% of the number of Dixon rings possible if the catalyst packed bed assembly had contained no catalyst bodies. The hydrophilic geometric area was 13 cm$^2$/cm$^3$ of bed compared to 8 cm$^2$/cm$^3$ of bed in the 50% catalyst packed bed assemblies in Example 7, runs F2C and F2D which is a 64% increase in the surface area.

A comparison of the data in Examples 3, 7 and 8 clearly indicates that the activity of a catalyst packed bed assembly can be improved by increasing the amount of platinum per unit bed volume, or more precisely, the platinum metal area, and by increasing the geometric surface area per unit bed volume on which the platinum catalyst is deposited. These data also indicate that the overall exchange rate, K$_y$a, can be improved by enhancing the water vapour-liquid water isotopic exchange rate by increasing the hydrophilic non-catalytic geometric surface area per unit bed volume.

In other embodiments other porous material than paper such as porous cloth are used for the carrier.

To obtain the maximum overall exchange rate it is important to maximize the rates of both reactions 1 and 2 and this is achieved by packing the greatest possible amount of hydrophilic surface area and catalytic hydrophobic surface area into the catalyst packed bed assembly while still maintaining a high void volume to permit the free flow of gas (hydrogen plus water vapour) and liquid water in the packed column under the desired operating conditions. From the test carried out the applicants feel this can best be accomplished according to the present invention in an ordered or regular packed bed assembly consisting of a mixture of corrugated or a mixture of corrugated and plane metal members of sheet or gauze packed in such a way that fluid passage interstices are provided between the sheets and with platinized carbon particles deposited on some of the sheets or gauze to provide the catalyst structure and bonded thereto with polytetrafluoroethylene, and the surfaces of the remaining sheets or gauze made hydrophilic to provide the packing structure. Adequate void volume is maintained by having at least one of these types corrugated.

Figure 6:
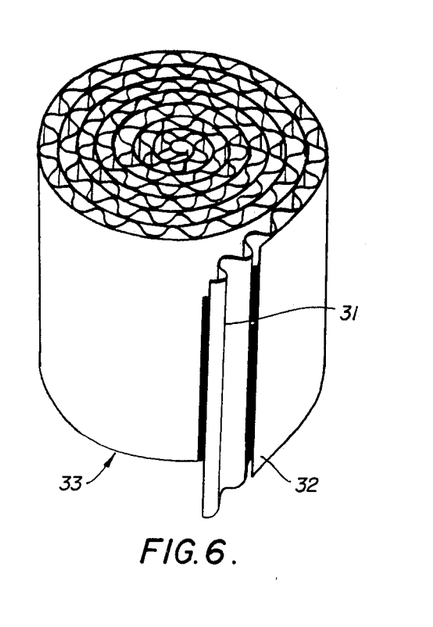
FIGS. 6 to 9 are perspective views of packing units for the catalyst packed bed assembly.
Figure 7:
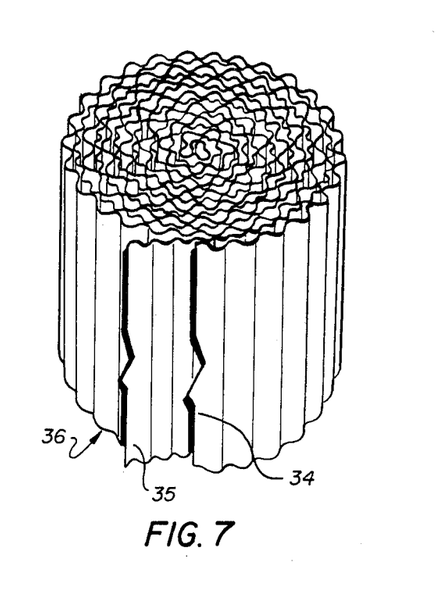

By way of example such a catalyst packed bed assembly could consist of packing units 33 or 36 as illustrated in FIGS. 6 and 7 respectively and with the packing units stacked one upon another in a column. In the packing unit 33, FIG. 6, corrugated hydrophilic metal sheet or gauze 31 and plane metal sheet or gauze 32 with platinum-carbon-Teflon catalyst bonded to both sides of the sheeting are rolled together to form the packing unit. Or the packing unit could have both sheets or gauze corrugated as in unit 36, FIG. 7, in which corrugated metal sheet or gauze with platinum-carbon-Teflon catalyst bonded to both sides of the corrugated sheet or gauze 34 and corrugated hydrophilic metal sheet or gauze 35, are rolled together to form the cylindrical packing unit 36.

Figure 8:
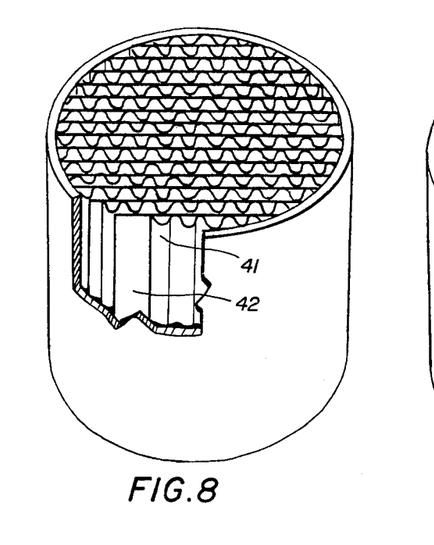
Figure 9:
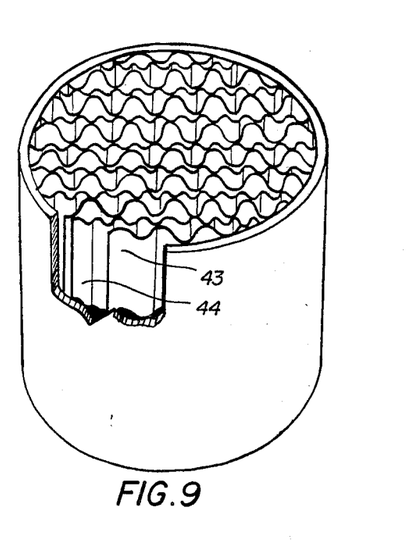

The ordered or regular packed bed assembly could also be prepared by stacking corrugated metal sheets in layers in a column as illustrated in FIGS. 8 and 9. In FIG. 8 corrugated hydrophilic metal sheets or gauze 41 and plane metal sheets or gauze 42 with platinum catalyst bonded to both sides of the sheet or gauze 42 are stacked in the column. Or the packing unit could have both types of sheets or gauze corrugated as in FIG. 9 in which corrugated sheet or gauze 43 with platinum catalyst bonded to both sides of the sheeting is stacked between corrugated hydrophilic metal sheets or gauze 44. The use of gauze should improve the mixing of the two phases over the column cross-section.

With the above examples of ordered or regular catalyst packed bed assemblies, the relative amounts of the catalytic and non-catalytic hydrophilic packing can be adjusted to obtain the most advantageous performance of the catalyst packed bed assembly that is, the highest overall transfer rate, $K_ya$, at the lowest possible cost. Other packing arrangements will suggest themselves to those experienced in maximizing mass transfer rates in packed columns. Further, sheet or gauze of, for example, a synthetic plastic material may be used instead of metal sheet or gauze as the support for the catalyst metal particles.

EXAMPLE 9

The Separation of Tritium by the Hydrogen-Liquid Water Isotopic Exchange Reaction To demonstrate that the hydrogen-water isotopic exchange reaction according to the present invention can be applied to the isotopic separation of tritium (mass 3), as well as to deuterium (mass 2) as shown in the previous examples, a test was performed with trace quantities of tritiated water in the feed water to the trickle bed reactor. In this test a catalyst similar to that described in Test 2 was used but with the partially platinized high surface area carbon containing 10% platinum deposited and bonded with polytetrafluoroethylene (Du Pont 30) to ceramic spheres pre-coated with polytetrafluoroethylene (Du Pont 30). The resulting catalyst contained 0.25% platinum and the ratio of the polytetrafluoroethylene to the partially platinized high surface area carbon was 3.0:1.

The activity of the catalyst for light hydrogen-tritium isotopic exchange was measured in a trickle bed reactor at 298 K and a pressure of 0.117 MPa. Measurements were made with a packed bed containing a random mixture of 50% catalyst bodies by volume and 50% non-catalytic hydrophilic ceramic spheres of the same size as the catalyst bodies. In this test, the catalyst bed assembly was contacted with an upward flow of purified natural hydrogen ($D/H$ = 118 ppm) containing essentially no tritium ($T/H \approx 2 \times 10^{-16}$) and with a downward flow of liquid water which contained tritium at a radioactivity level of 5.70 $\mu$Ci/g of water ($T/H$ = 1.76 $\times$ 10$^{-9}$). The liquid water was also enriched in deuterium ($D/H$ = 1043 ppm) so that the activity of the catalyst for the separation of deuterium could be measured simultaneously with the corresponding measurements for the separation of tritium. As in the previous tests the hydrogen gas was first passed upward through a humidifier consisting of a column packed with non-catalytic 6.1 mm diameter ceramic spheres, in which the effluent water from the catalyst bed assembly flowed downward. This arrangement served to saturate the hydrogen gas with water vapour in isotopic equilibrium with the liquid water leaving the bottom of the catalyst bed assembly.

The amount of tritium and deuterium transferred between the two streams as they passed through the catalyst bed assembly was determined by measuring the increase in the tritium and deuterium content of the hydrogen gas stream, free of water vapour, after its passage through the column. Samples of the dry effluent hydrogen which contained $\approx$ 0.3 mCi/m$^3$ at STP ($T/H \approx 1.2 \times 10^{-10}$) were oxidized to water in a burner using a 75% oxygen-argon gas stream. The resulting water was collected in a liquid nitrogen trap and its tritium content was determined by liquid scintillation counting. The tritium isotope exchange efficiency, $\eta$, for the column was calculated in a manner analogous to that previously described for deuterium In the calculation the equilibrium constant for the isotopic exchange reaction between HT and natural liquid water $$HT_{gas} + H_2O_{liquid} \rightleftharpoons HTO_{liquid} + H_2$$

was taken as 7.00 at 298 K.

Measurements of the activity of the catalyst for the separation of tritium and for the separation of deuterium in a trickle bed reactor at 298 K and 0.117 MPa are summarized in Table 9 for various hydrogen flow rates.

TABLE 9

The Activity of a 0.25% Platinum-Carbon-Teflon Catalyst for the Separation of Tritium and for the Separation of Deuterium

| Conditions: | Column length | - 0.250 m |
| | Column area | - 480 mm$^2$ |
| | Temperature | - 298.2K |
| | Pressure | - 0.1166 MPa |
| | Water Flow | - 1.9 kg/s m$^2$ |

| H$_2$ Flow (m/s STP) | $K_ya$ (m$^3$ STP/s m$^3$)  | |
| --- | --- | --- |
| | For Tritium | For Deuterium |
| 0.273 | 1.17 | 0.73$_3$ |
| 0.418 | 1.22 | 0.77$_5$ |
| 0.686 | 1.29 | 0.89$_9$ |
| 1.260 | 1.46 | 1.01$_6$ |

These results clearly demonstrate that the packed catalyst bed assembly of the present invention is very effective for the tritium (mass 3) — light hydrogen (mass 1) as well as for the deuterium (mass 2) — light hydrogen (mass 1) isotopic exchange reaction between hydrogen gas and liquid water. The rate of the tritium isotopic exchange reaction is about 1.5 times faster than that for the deuterium isotopic exchange reaction thus facilitating the separation of tritium. These results indicate that in the isotopic exchange reaction between hydrogen gas and liquid water there is an inverse secondary kinetic isotope effect.

We claim:

1. A process for the exchange of hydrogen isotopes using a catalyst bed assembly, comprising:
   a. simultaneously contacting streams of liquid water and hydrogen with one another and a catalyst packed bed assembly in the path of the contacting streams, both of said streams being at a temperature in the range 273° to 573° K., with one of the streams containing a concentration of a hydrogen isotope in excess of that which it would contain when the liquid water-gaseous hydrogen streams are in isotopic equilibrium at the operating conditions of temperature and mass flow rates of the streams and the other stream being a deficient stream and containing a concentration of that hydrogen isotope which is less than that which it would contain when the liquid water gaseous hydrogen is in equilibrium at said operating conditions, so that the deficient stream is enriched by transfer of the hydrogen isotope in a two-step hydrogen isotope exchange process from the other stream with the following simultaneous reactions being closely coupled in space Step 1

Step 2 b. recovering the said stream enriched in the hydrogen isotope, and wherein:
   c. the catalyst packed bed assembly comprises:
      i. a catalyst structure comprising at least one carrier, catalyst crystallites of at least one catalytically active metal selected from Group VIII of the Periodic Table on the support, and a water repellent, water vapour and hydrogen gas permeable, porous, polymeric material partially enclosing the catalyst crystallites to substantially inhibit the contact of liquid water with the catalyst crystallites while allowing contact therewith of hydrogen gas and water vapour from the liquid water, and
      ii. a packing structure interspersed with (i) to form therewith the catalyst packed bed assembly across the whole path of the contacting streams, and having an exterior surface which is substantially hydrophilic and relatively noncatalytically active with regard to hydrogen isotope exchange between hydrogen gas and water vapour to that of the catalyst bodies, so that:
   d. the hydrogen isotope exchange primarily occurs simultaneously between hydrogen gas and water vapour contacting the catalyst crystallites, and between water vapour contacting the liquid water and that liquid water, and the substantially hydrophilic exterior surface of the packing structure increases the contact surface area between the water vapour and liquid water thereby increasing the rate of hydrogen isotope exchange between water vapour and liquid water.

2. A process according to claim 1, wherein the catalyst packed bed assembly comprises corrugated sheets with fluid passage intertices between them, platinized carbon particles are deposited on some of the sheets to provide the catalyst structure and are bonded thereto with polytetrafluoroethylene, and the remaining sheets have hydrophilic surfaces.

3. A process according to claim 1, wherein the catalyst packed bed assembly comprises a mixture of corrugated and plane sheets with fluid passage interstices between them, platinized carbon particles are deposited on some of the sheets to provide the catalyst structure and are bonded thereto with polytetrafluoroethylene, and the remaining sheets have hydrophilic surfaces.

4. A process according to claim 1, wherein the catalyst packed bed assembly comprises corrugated gauze members with fluid passage interstices between them, platinized carbon particles are deposited on some of the members to provide the catalyst structure and are bonded thereto with polytetrafluoroethylene, and the remaining members have hydrophilic surfaces.

5. A process according to claim 1, wherein the catalyst packed bed assembly comprises a mixture of corrugated and plane gauze members with fluid passage interstices between them, platinized carbon particles are deposited on some of the members to provide the catalyst structure and are bonded thereto with polytetrafluoroethylene, and the remaining members have hydrophilic surfaces.

6. A process according to claim 1, wherein the catalyst structure comprises a plurality of discrete catalyst bodies and the packing structure comprises a plurality of discrete packing bodies intermingled with the discrete catalyst bodies.

7. A process according to claim 6, wherein the catalyst bodies and packing bodies are randomly dispersed together to form the packed catalyst bed assembly.

8. A process according to claim 6, wherein the catalyst packed bed assembly comprises layers of catalyst bodies alternating with layers of the packing bodies, with each layer extending across the whole width of the contacting streams.

9. A process according to claim 6, wherein the catalyst packed bed assembly contains catalyst bodies whose volume is in the range of 1% to 80% of the total volume of the catalyst and packing bodies in the catalyst packed bed assembly.

10. A process according to claim 6, wherein the catalyst bodies each comprise the carrier, platinized carbon particles deposited on the carrier, and polytetrafluoroethylene bonding the platinized carbon to the carrier.

* * * * *